Nov. 11, 1969
L. F. G. LEGRAND
3,477,665
VIBRATION ATTENUATING METHOD AND ELECTROHYDRAULIC ATTENUATOR FOR ROTARY-WING AIRCRAFT
Filed Aug. 17, 1967
4 Sheets-Sheet 1
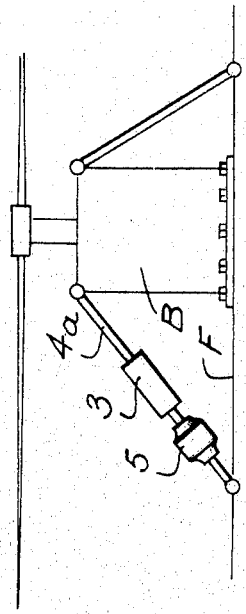
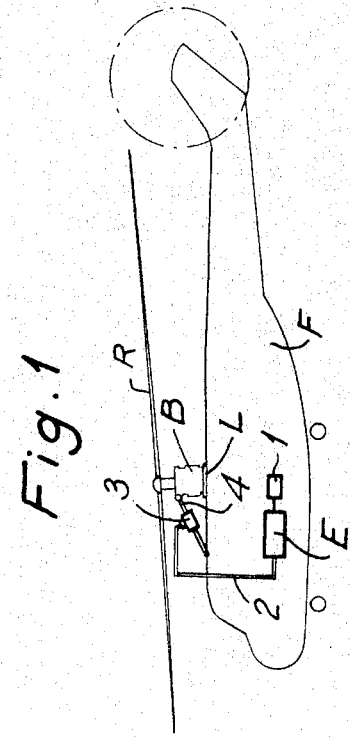
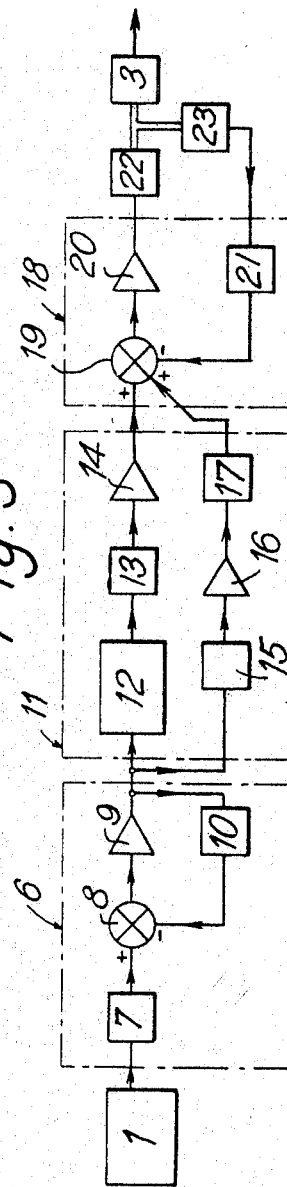

Fig. 4
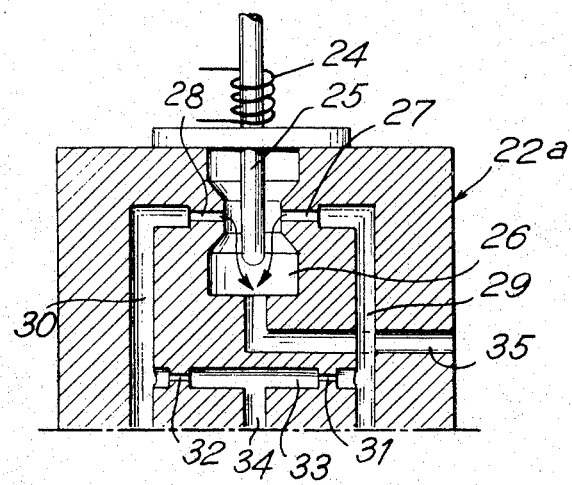
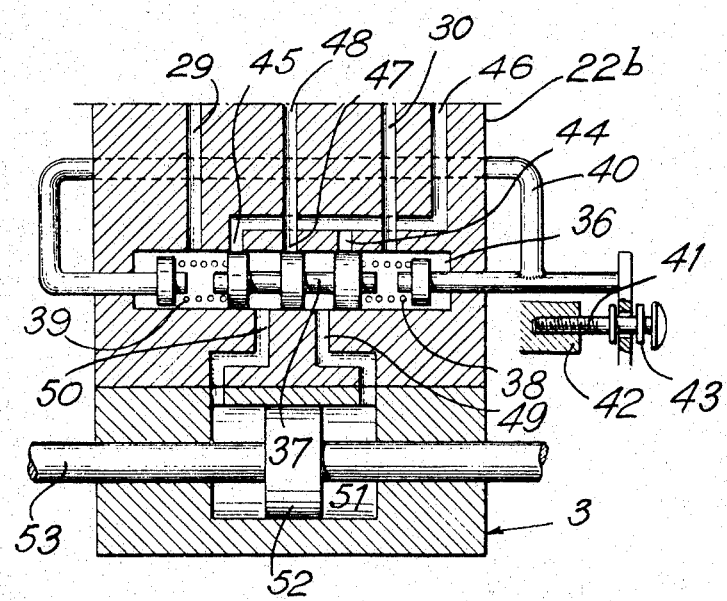
Fig. 5

United States Patent Office 3,477,665
Patented Nov. 11, 1969

3,477,665
VIBRATION ATTENUATING METHOD AND ELECTROHYDRAULIC ATTENUATOR FOR ROTARY-WING AIRCRAFT
Louis François Georges Legrand, Aix-en-Provence, France, assignor to Sud-Aviation Societe Nationale de Constructions Aeronautiques, Paris, France
Filed Aug. 17, 1967, Ser. No. 661,341
Claims priority, application France, Sept. 16, 1966, 76,594
Int. Cl. B64 27/32
U.S. Cl. 244—17.25               13 Claims

ABSTRACT OF THE DISCLOSURE

Vibrations aboard a rotary wing aircraft are attenuated electrohydraulically by converting electrical signals, generated by dynamic accelerations measured on the aircraft, into changes in hydraulic pressure in a double-acting jack supported by a structural member interconnecting the rotor support and the aircraft fuselage to produce pulses countering the vibrations.

---

This invention relates to a method and apparatus for electrohydraulically attenuating vibration aboard a rotary-wing aircraft, consisting in generating, on the basis of the dynamic accelerations measured on the aircraft, suitably adjusted and phase-shifted electric signals which are transmitted to an electrohydraulic servo-control carried by a structural member connecting the rotor support to the fuselage of the aircraft, whereby to use the rotor itself and the masses associated thereto for creating the desired inertia effects.

Due chiefly to the aerodynamic asymmetries occurring on the revolving rotor blades of rotary-wing aircraft, the rotors are subjected to alternating loads at frequencies which are multiples of the rotor speed and of the number of blades. These loads are transmitted to the fuselage and cause it to vibrate at the same frequencies.

Such vibration can be attenuated in one or more of the following ways:

By adapting the natural frequencies of the blades;
By adapting the natural frequencies of the rotor/fuselage system so as to create a suspension effect;
By mounting resonators tuned to the frequency to be filtered on the blades, on the controls or in the fuselage;
By using mechanical exciters for generating vibration of predetermined frequencies, the amplitudes and phase-shifts of which are so adjusted as to counter the natural vibrations.

The disadvantage of systems based on the generation of inertia forces is that they call for sizeable masses in order to perform their functions.

The present invention has for its object to overcome this drawback, and it is accordingly a first teaching of the invention to provide an electrohydraulic vibration-attenuating method consisting in generating, on the basis of the dynamic accelerations measured on the aircraft, suitably adjusted and phase-shifted electrical signals which are transmitted to an electrohydraulic servo-controlled valve which converts them into changing hydraulic pressures communicated to a double-acting jack carried by a structural member interconnecting the rotor support and the fuselage, whereby to produce pulsations opposing the natural vibrations and thereby use the rotor itself and the masses associated to it for creating the desired inertia effects.

The subject method of this invention consists in routing the vibration detection and measurement signals into an electronic network which filters them through the required frequency band, forms these signals and then amplifies them prior to applying them to the electrohydraulic servo-valve.

In order to obviate the need for potentiometer systems, the electrical detection signals are formed on the basis of an alternating reference voltage.

The filtering through the required frequency band is accomplished by first demodulating the vibration detection and measurement signals and then amplifying them by means of a network devised to transmit the signals of determinate frequency on a preferential basis.

After being filtered, the signals are applied, on the one hand, to a direct circuit where they are modulated at the reference frequency and amplified, and on the other hand to a shunt circuit which artificially creates electrical signals having a phase lead over the previous signals, following which these signals are modulated at the reference frequency and amplified. The signals issuing from the direct circuit and from the shunt circuit are then summed and the resulting signals are continuously compared subtractively with those emitted by a differential pressure sensor which measures and converts the instantaneous pressure differential across the two chambers in the hydraulic jack into an adjustable electrical voltage.

The signals resulting from this comparison are then amplified again to a level adequate for energizing the electrohydraulic servo-valve supplying pressure-fluid to the hydraulic power jack.

It is possible in this way to obtain at the hydraulic jack output forces which are proportional to the magnitudes of the input signals and to correct linearity defects, notably in the ultimate stage of conversion of the signals.

The present invention likewise relates to various forms of embodiment of apparatus for performing the method hereinbefore disclosed, comprising an accelerometer which is positioned at a point on the fuselage where the vibration is to be reduced and which is electrically connected to an electronic control network which filters, forms and amplifies the signals delivered by the accelerometer and which is itself electrically connected to an electrohydraulic servo-valve supplying pressure-fluid to a jack, said jack being preferably carried by one of the interconnecting struts provided between the aircraft fuselage and the main gearbox used to transmit power to the rotor.

The jack and the servo-valve forming the hydraulic relay system constitute a block rigidly connected to said strut.

Mounted on said block is a differential pressure sensor connected to the two jack chambers.

The vibration attenuating strut formed thus may be used to interconnect the top of said gearbox with the fuselage additionally to the normal interconnecting struts, provided that the latter are flexible enough to ensure correct operation of the system.

In an alternative constructional form, said vibration attenuating strut may be one of the normal interconnecting bars referred to, in which case it will include an elastic member to impart the required flexibility without jeopardizing the ability to transmit the lift and manoeuvering loads. In this constructional form the jack is connected in parallel with the elastic member, which member is preferably annular shaped.

The principal advantages of such a system are its lightness, the ease with which it can be fitted regardless of the way in which the fuselage is suspended from the rotor, ready adaptation to the frequencies and powers to be developed, and its low cost resulting from the use of conventional electronic, electric and hydraulic components offering a high degree of reliability and requiring no additional work for adapting and developing them.

3

The description which follows with reference to the accompanying non-limitative exemplary drawings will give a clear understanding of how the invention can be carried into practice.

In the drawings:

FIGURE 1 is a highly diagrammatic viewing of the arrangement of the subject apparatus of this invention on a helicopter.

FIGURE 2 shows on an enlarged scale an arrangement for the attenuating strut.

FIGURE 3 is a block diagram of the electronic channel between the accelerometer and the jack.

FIGURE 4 is a schematic sectional showing of the driving stage of the electrohydraulic servo-valve.

FIGURE 5 is a similar sectional viewing of the servo-valve relay slide-valve and the jack.

Figure 6:
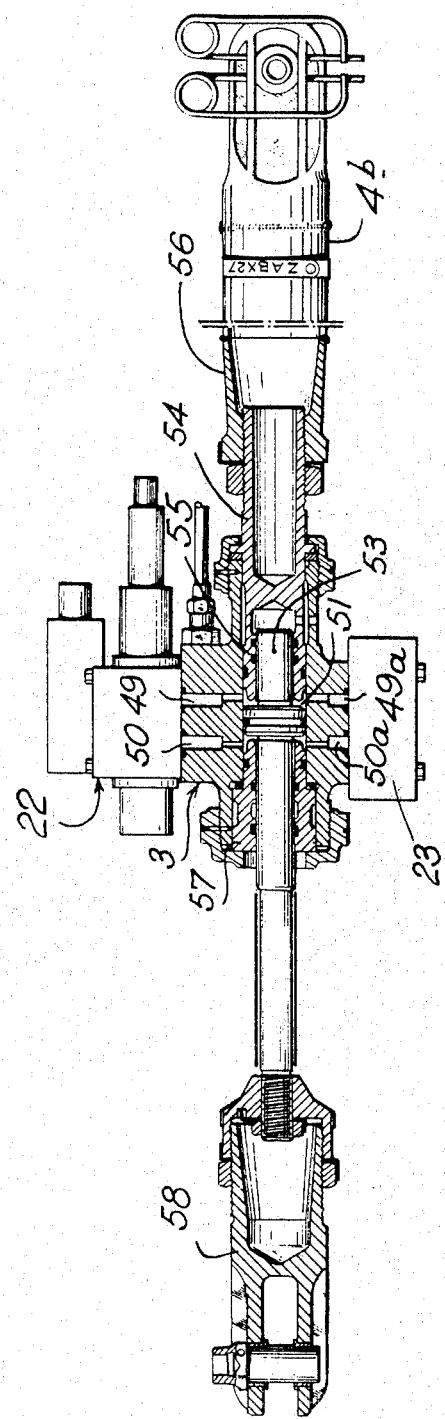
FIGURE 6 shows in partial section an attenuating strut devised for inclusion in the tie system between the fuselage and the transmission box.

In the constructional forms illustrated in the accompanying drawings, a helicopter fuselage F is supported by a rotor R rotatably mounted on a transmission box B connected to fuselage F by securing means L. An electronic unit E is electrically connected to an accelerometer 1 and, via a connection 2, to an electrohydraulic unit 3 forming part of a strut 4 interconnecting transmission box B with the structure of fuselage F.

As shown in FIGURE 1, the strut 4 may be a strut additional to the normal tie means provided between box B and fuselage F.

As is shown on an enlarged scale in FIGURE 2, the strut 4a may on the contrary form part of those providing the normal tie means between box B and fuselage F, in which case strut 4a includes an elastic member 5 adapted to absorb the helicopter lift and manoeuvering loads while providing the flexibility required for operation of the system.

As will be explained hereinafter, the unit 3 includes an exciter jack cylinder, an electrohydraulic servo-valve, a relay slide-valve between the servo-valve and the jack, and a differential pressure sensor mounted on the jack cylinder itself.

As FIGURE 3 clearly shows, the accelerometer 1, the electrical sensing signals from which are generated off an alternating reference voltage, is electrically connected to a filtering unit 6 operative over a given frequency band and comprising a demodulation cell 7, a summing network 8, an amplifier 9 and a correction network 10. The accelerometer output is connected for input to demodulation cell 7, which cell is additively connected to summing network 8. Network 8 is connected to amplifier 9, the output from which is in turn connected to correction network 10, the output from the latter being subtractively connected to network 8.

This output from amplifier 9 is connected to a signal adjusting unit 11 which includes a phase-advancing cell 12, a modulation cell 13 and an amplifier 14, together with a second modulating cell 15, a second amplifier 16 and a direct gain adjustment cell 17.

The output from amplifier 9 is connected for direct input to circuit 12, the output from which is routed for input to modulator 13, the output from the latter being in turn connected to the input of amplifier 14. Similarly, amplifier 9 is connected for input to modulator 15 whose output is applied to the input of second amplifier 16, the output from the latter being connected for input to gain adjustment cell 17.

The outputs from amplifier 14 and cell 17 are electrically connected to a unit 18 and, more specifically, within this unit, to an additive summing network 19 the output from which is routed for input to a power ampli-

4 fier 20. Unit 18 further includes an adjustment network 21 the output from which is subtractively connected to network 19.

The output from amplifier 20 is connected to a servo-valve 22, which valve is hydraulically connected to jack 3. This system is hydraulically connected to a differential pressure sensor 23 electrically connected to adjustment network 21.

As FIGURE 4 shows, driving stage 22a of servo-valve 22 has an actuating winding 24 which activates a movable vane 25 positioned inside a space 26 in the servo-valve, into which space extend symmetrically two calibrated openings 27 and 28. These calibrated openings are supplied through ducts 29 and 30 which are themselves supplied through calibrated openings 31 and 32 symmetrically located at the ends of a transverse branch 33 terminating a supply duct 34 communicating with a source of pressure-fluid.

Beneath vane 25, the space 26 connects axially with a discharge duct 35.

As shown in FIGURE 5, in relay slide-valve 22b of servo-valve 22, ducts 29 and 30 communicate with the cylinder 36 of a distributor slide-valve, on either side of the three-piston compound slide-valve 37. Compound slide-valve 37 is positioned between two return springs 38 and 39 which react against the opposed end-faces of a zero adjustment clevis 40 operated by an adjustment screw 41 fitted with a knob. Screw 41 cooperates with a tapped hole formed in a fixed member 42 rigid with the slide-valve block and carries two collars 43 between which engages a fork fast with clevis 40.

Ducts 29 and 30 open into cylinder 36, externally of slide-valve 37, in the spaces containing springs 38 and 39, respectively.

In the neutral position, the two outer slide pistons mask two symmetrically located ports 44 and 45 communicating with a discharge duct 46. The central piston masks a port 47 communicating with an inlet duct 48 which is in turn connected to a source of pressure-fluid.

In this neutral position, the three pistons of compound slide-valve 37 mutually confine two spaces into which open ducts 49 and 50 communicating with the chambers of a double-acting cylinder 51 formed in the main casting of jack 3, and this cylinder contains a jack piston 52 fast with a symmetrical rod 53.

In the constructional form illustrated in FIGURE 6, the jack casting 3 on which are mounted the servo-valve unit 22 and the differential pressure sensor 23 is rigid with a tubular element 54 which forms, respectively on either side of a partition wall, a guide 55 for one of the ends of piston-rod 53 and a hollow extension screwed into a ferrule 56 for coupling one end of strut section 4b.

A second guide 57 for rod 53 is inserted into casting 3, the chambers of cylinder 51 being formed between the two guides 55 and 57. Leaktight seals are interposed between said guides and the casing and between the guides and the rod. Guides 55 and 57 are retained in the jack casting by collar nuts.

Rod 53 is securely screwed into a further attachment clevis 58.

Within casting 3 are formed the ducts 49 and 50 referred to precedingly and, facing the latter, the ducts 49a and 50a for communicating with sensor 23. A leak monitoring duct is furthermore provided.

The assembly described hereinabove constitutes the attenuation strut 4 portrayed in FIGURE 1. This strut, which forms a redundant tie, is added to the set of struts or structural members forming the L-junction between box B and fuselage F. This assembly transmits the lift and manoeuvering loads while strut 4 performs the sole function of generating the vibrations which counter the natural vibrations.

Figure 7:
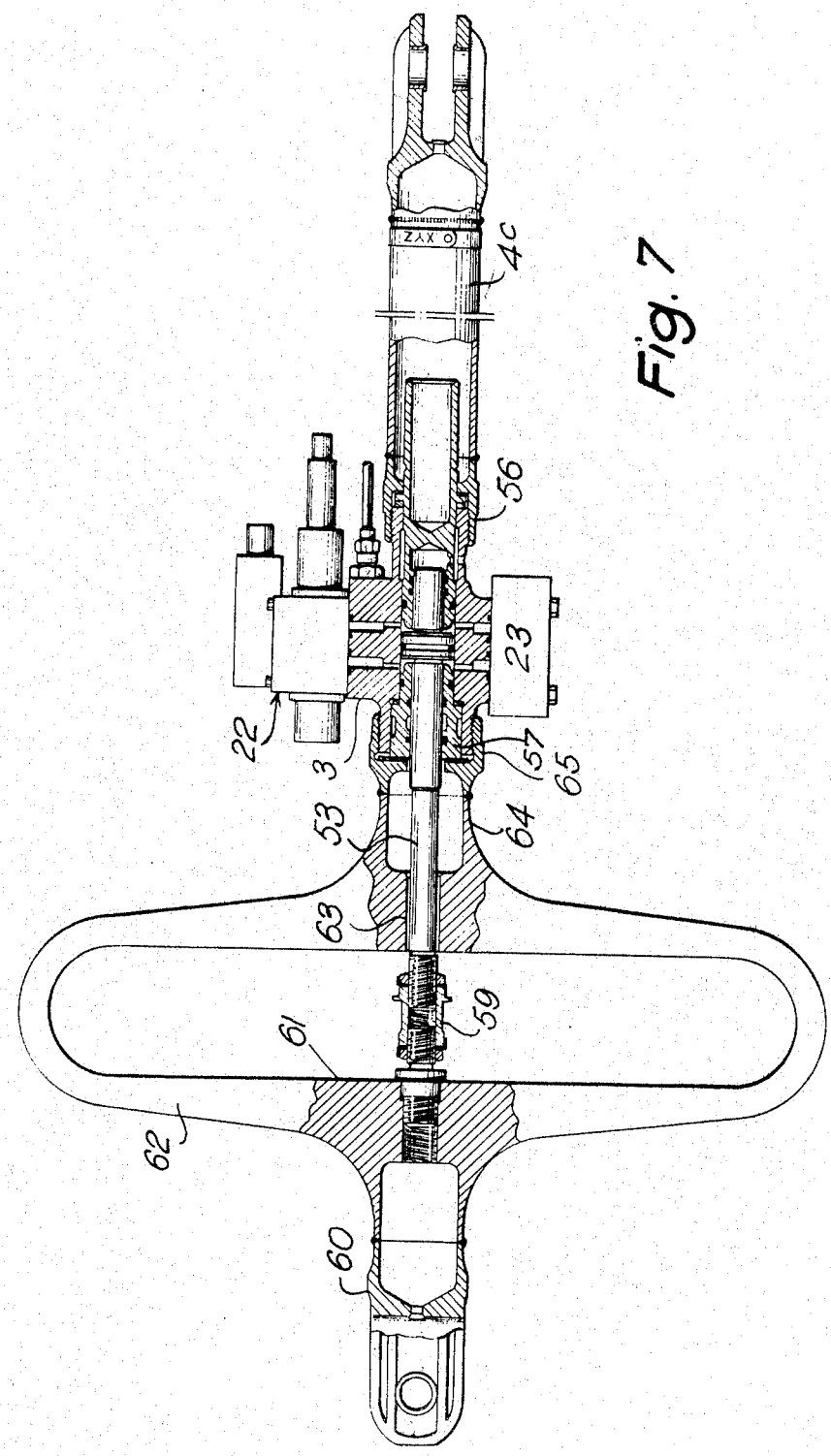
FIGURE 7 shows an alternative embodiment of an attenuating strut providing a direct tie between the fuselage and the transmission box and comprising an elastic device connected in parallel with the jack.

Reference is now had to FIGURE 7 for a constructional form in which the jack casting 3 and its auxiliaries are identically devised and identically coupled to the ferrule 56 of a strut end 4c, which ferrule may be identical or not to the one previously described.

In this embodiment, however, the projecting end of rod 53 is attached through the agency of a coupling and adjustment sleeve 59 to an attachment clevis 60 and more precisely to the inner face 61 of the opening in a substantially oblate oval elastic ring 62 made fast with clevis 60. To this end rod 53 extends freely through an opening 63 in the opposite face of ring 62, which ring is joined by means of an extension 64 to a collar nut 65 screwed over the threaded end of casting 3 and retaining within it the guide 57.

The above-described assembly forms the strut 4a shown in FIGURE 2, the elastic system 5 of which is in turn formed by the ring 62. This strut 4a constitutes a non-redundant structural member connecting box B to fuselage F. In this case ring 62 transmits the lift and manoeuvering loads between box B and fuselage F while at the same time permitting free development of the controlled vibrations which counter the natural vibrations.

The principle of operation of the subject device of this invention, described herein, is as follows:

The vibrations are measured at the selected location on the fuselage by the accelerometer 1, which may be of any convenient known type, and this accelerometer delivers an alternating voltage of amplitude proportional to the corresponding acceleration.

The accelerometer may consist for example of an extensometer wire which, as it stretches and contracts in response to changes in acceleration, causes the electrical resistance to vary in one of the branches of a Wheatstone bridge.

In the electrical block diagram shown in FIGURE 3, the data issue from accelerometer 1 and from the Wheatstone bridge associated thereto for input to a selective filter 6, the function of which is to amplify those of the signals which lie within the relevant frequency band. The signals delivered by accelerometer 1 are demodulated by demodulator 7, then amplified in amplifier 9, and this amplifier 9 is shunted by correction network 10 which forms a negative feedback element having an impedance which may or may not be chosen as a function of the frequency. Thus, a high impedance for a given frequency permits preferential transmission of the signals of that frequency.

The signals filtered and amplified in this way are shaped in unit 11. Circuit 12 imparts a phase lead to the incoming signals and these phase-shifted signals are modulated at 13 and amplified at 14. The signals issuing from amplifier 9 are for their part modulated at 15, then amplified at 16 prior to undergoing a gain adjustment at 17.

The signals from amplifier 14 and those issuing from gain adjusting element 17 are additively mixed in network 19, while the signals from sensor 23 subsequent to passage through adjustment network 21 are subtractively mixed in network 19. The signals resulting from this mixture are amplified in amplifier 20, the output from which is connected to winding 24 of servo-valve 22. The comparison between the signals, effected in summing network 19, enables excitation forces to be obtained at the output of jack 3 that are proportional to said signals, with suitable correction for linearity defects in the response obtained in electronic unit 18 and sensor 23, i.e. in the ultimate part of the channel, this being accomplished by means of the servo feedback function performed by sensor 23 and network 21, due to the fact that sensor 23 monitors operation of the ultimate element in the channel.

The electrical pulses energizing winding 24 cause the vane 25 to shift from its neutral midway position, and the new position of this vane affects the hydraulic flowrates from ports 27 and 28. Since the pressure losses in ports 31 and 32 depend on the flowrates, the pressures prevailing in ducts 29 and 30 will be equal respectively to the differences between the supply pressure in duct 34 and each of said pressure losses. The difference in pressure between ducts 29 and 30 will therefore depend on the position of vane 25 and hence on the voltage across the terminals of winding 24. These differences in pressure cause corresponding shifts of the distribution relay slide-valve 37, that will be a function precisely of said differences in pressure. As it moves, the compound slide-valve 37 causes one or the other of ducts 49 or 50 to be supplied and the other to be vented, with a corresponding effect on the associated chambers of cylinder 51 of jack 3.

It is to be noted that the midway position of compound slide-valve 37 can be adjusted by a clevis 40. The double-acting jack 3 proper has a short stroke and constitutes the element which generates the pulses for countering the vibrations to be attenuated. The close proximity of the jack casting, the servo-valve and the differential pressure sensor reduces the length of interconnecting piping to a minium and correspondingly increases the fidelity of transmission.

The differential pressure sensor itself is a conventional unit well-known per se which does not call for a detailed showing, being merely intended to measure the pressure differential across the two jack chambers and convert it into an alternating voltage modulated at the reference frequency, the amplitude of which is a function of said differential and the phase dependent on the sense of this differential.

The elastic ring 62, which absorbs the lift and manoeuvering loads in the strut 4a shown in greater detail in FIGURE 7, is mounted axially on said strut in parallel with the vibratory energy-generating jack.

It will readily be appreciated that the different arrangements hereinbefore described enable natural vibrations to be effectively countered and their effects on the fuselage to be substantially cancelled out.

The system comprising a strut 4 can easily be mounted on any existing type of helicopter, while the assembly comprising an elastic-ringed strut 4a could be incorporated in any rotor box suspension system specifically designed for the purpose.

It goes without saying that many changes may be made in the forms of embodiment and in the different steps of the method hereinbefore described.

What I claim is:

1. A method of electrohydraulically attenuating vibrations aboard a rotary-wing aircraft, comprising, in combination, the steps of generating, on the basis of the dynamic accelerations measured on the aircraft, suitably adjusted and phase-shifted electrical signals, of converting these electrical signals into changes in hydraulic pressure by means of an electrohydraulic servo-valve, and of transmitting these changes to a double-acting jack supported by a structural member interconnecting the rotor support to the fuselage of said aircraft, whereby to produce pulses countering said vibrations and thereby utilize the rotor itself and the masses associated thereto for generating the desired inertia effects.

2. A method as claimed in claim 1, wherein said vibration-detecting electrical signals are filtered through a given frequency band.

3. A method as claimed in claim 2, wherein the filtered signals undergo forming, amplification and a phase lead.

4. A method as claimed in claim 3, wherein, subsequent to filtering, the signals are on the one hand routed through a bypass circuit whereby to receive a phase-lead followed by modulation and amplification and, on the other hand, subjected, in a direct circuit without a phase-shift, to a modulation, an amplification and an adjustment of gain, the signals issuing from said direct circuit and from said bypass circuit being then added together.

5. A method as claimed in claim 4, including the further steps of subjecting the signals resulting from the ultimate addition to a power amplification, of applying these amplified signals to a servo-valve for distributing hydraulic pressure-fluid to a jack member, of measuring the differential pressure across the chambers of said jack member, of converting this measurement into an electrical voltage and of subtractively applying these electrical voltages, subsequent to adjustment, to the summed in-phase and out-phased signals.

6. A device for attenuating vibrations aboard a rotary-wing aircraft having a fuselage and a lift rotor, comprising an accelerometer which is located within said fuselage at a point where the vibrations are to be measured and which delivers electrical signals and is electrically connected to an electronic control network comprising a filtering unit, a signal-forming unit and a unit for amplifying said electrical signals from the accelerometer, said amplification unit being electrically connected to an electrohydraulic servo-valve for supplying pressure-fluid to a jack member which is supported by a structural member forming a tie between the aircraft fuselage and the means for securing the rotor thereto.

7. A device as claimed in claim 6, wherein said jack member is connected to a pressure differential sensor delivering servo-control feedback signals.

8. A device as claimed in claim 7, wherein said jack member, said servo-valve and said differential pressure sensor are positioned in close proximity to one another and jointly form a block carried by a structural tie member between the fuselage and the means for securing the rotor thereto.

9. A device as claimed in claim 8, wherein said structural tie member is a redundant strut forming part of the tie means between the fuselage and the means for fixing the rotor thereto.

10. A device as claimed in claim 8, wherein said structural tie member is one of the struts of the normal tie means between the fuselage and the means for fixing the rotor thereto, and comprises a lift and manoeuvering load transmitting elastic member connected in parallel with said jack member.

11. A device as claimed in claim 10, wherein said elastic member is an oval ring having the outside of one of its sides fast with the body of said jack member, the piston rod of said jack member extending freely through said ring and being adjustably secured to the other side of said ring.

12. A device as claimed in claim 6, wherein said servo-valve comprises, in combination, between two calibrated ports for controlled discharge of a hydraulic fluid and within a chamber communicating with an opening for discharge of said fluid, a movable vane, an external electrical winding for magnetically actuating said vane, a slide-valve relay having control chambers hydraulically connected to calibrated delivery outlets communicating with the ports facing said vane, whereby the position of said vane controls the pressure losses at said calibrated delivery outlets of hydraulic fluid into said slide-valve relay control chambers, said relay being hydraulically connected to the chambers of said jack member and to a discharge duct, whereby said slide-valve relay effects a regulated distribution of hydraulic fluid among said jack member chambers and said discharge duct.

13. A device as claimed in claim 12, wherein the compound slide of said slide-valve is positioned between the ends of a clevis comprising means external to said slide-valve for adjusting the longitudinal position of said compound, spring means being positioned between each end of said compound and the adjacent end of said clevis.

References Cited
UNITED STATES PATENTS

| | | | |
|---|---|---|---|
| 2,395,143 | 2/1946 | Prewitt | 244—17.27 |
| 2,949,254 | 8/1960 | Bauer | 244—17.27 |
| 2,964,272 | 12/1960 | Olson | 248—20 XR |
| 3,172,630 | 3/1965 | Goodman | 248—20 |
| 3,216,679 | 11/1965 | Curwen | 248—20 |

MILTON BUCHLER, Primary Examiner

P. E. SAUBERER, Assistant Examiner

U.S. Cl. X.R.

170—159; 248—19, 358